(12) United States Patent
Stubbs et al.

(10) Patent No.: US 6,602,539 B2
(45) Date of Patent: Aug. 5, 2003

(54) COOKED BEAN PRODUCT HAVING REDUCED SOLIDS CONTENT AND IMPROVED VISCOSITY

(75) Inventors: Timothy A. Stubbs, Gurnee, IL (US); Betsy O. Battle, Schaumburg, IL (US); Andrew E. McPherson, Mt. Prospect, IL (US); Christopher J. Mitchell, Chicago, IL (US); Bradley J. Swenson, Grayslake, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/852,572

(22) Filed: May 10, 2001

(65) Prior Publication Data

US 2002/0187242 A1 Dec. 12, 2002

(51) Int. Cl.$^7$ .................................................. A23L 1/20
(52) U.S. Cl. ....................................... 426/634; 426/629
(58) Field of Search ................................ 426/634, 460, 426/506, 507, 508, 629

(56) References Cited

U.S. PATENT DOCUMENTS

| 3,751,410 A | * | 8/1973 | Caracci et al. | |
|---|---|---|---|---|
| 3,951,947 A | | 4/1976 | Schanefelt et al. | 260/233.3 |
| 4,407,840 A | | 10/1983 | Lathrop et al. | 426/629 |
| 4,676,990 A | | 6/1987 | Huffman et al. | 426/634 |
| 4,871,567 A | | 10/1989 | Sterner et al. | 426/461 |
| 4,973,447 A | | 11/1990 | Seib et al. | 426/549 |
| 5,725,902 A | | 3/1998 | Lesueur-Brymer et al. | 426/634 |
| 5,980,971 A | | 11/1999 | Walsh | 426/634 |

FOREIGN PATENT DOCUMENTS

| JP | 59051746 | * | 3/1984 |
|---|---|---|---|
| JP | 07222566 | * | 2/1994 |
| JP | 2882990 | * | 4/1999 |
| JP | 3016895 | * | 3/2000 |

OTHER PUBLICATIONS

Rutenberg, M.W. and Slarek, D. 1984, D. 1984 Starch Derivatives: Production and Uses, Chapter in Starch Chemistry and Technology 2$^{nd}$ Ed. R.L. Whister, J.N. Bemiller, and E.F. Paschall, eds.

Langan, R.E. Food Industry, Chapter in Modified Starches: Properties and Uses. O.B. Wurzburg, ed.

* cited by examiner

Primary Examiner—Anthony J. Weier
(74) Attorney, Agent, or Firm—Fitch, Even, Tabin & Flannery

(57) ABSTRACT

The present invention provides compositions which have reduced amounts of solids for preparing cooked leguminous food products. During preparation of the food products, the compositions have a hot viscosity sufficiently low enough to facilitate mechanical pumping and other processing of the compositions. The compositions include a starch component in an amount effective for providing the hot viscosity of the compositions as well as a final viscosity of the cooked leguminous food product such that the food product has an enhanced consistency and texture. The compositions are prepared by processing legumes for cooking, blending the starch component and water with the legumes to provide a composition having a predetermined amount of legumes, heating the composition to provide a cooked legume composition, and processing the composition further to provide a containerized cooked food product. The compositions are particularly suited for preparation of a cooked refried bean product.

17 Claims, 1 Drawing Sheet

COOKED BEAN PRODUCT HAVING REDUCED SOLIDS CONTENT AND IMPROVED VISCOSITY

FIELD OF THE INVENTION

This invention relates to an improved cooked legume product having a reduced solids content. By incorporating a starch component, preferably a modified food starch, during preparation of the product, particularly a refried bean product, the amount of bean solids is reduced and mechanical processing of the bean product is facilitated. The incorporation of starch also improves the consistency and stability of the finished bean product. The invention also relates to methods of preparing a stabilized cooked bean product having reduced bean solids content, yet having an improved viscosity, that is readily spoonable and is resistant to scorching during reheating of the bean product for consumption.

BACKGROUND OF THE INVENTION

Refried beans are a popular food item common to Mexican and Southwestern cooking styles. Traditionally, refried beans are made from scratch using beans, water, oil, lard or other fat substances, and spices. Such preparation is time consuming and requires some level of culinary skill in order to achieve desired, consistent results.

Canned refried bean products provide a time-saving alternative to making refried beans from scratch. The canned product requires only reheating prior to consumption of the refried beans. As a result of the convenience and overall simplicity of canned refried beans, use of these products has become widespread, both by the food service trade and the individual consumer.

Canned refried beans typically include water, beans, such as pinto beans, and spices and other flavorants. The mixture is heated to fully cook the beans and to lower the water content to provide a desired final viscosity of the bean product. To complete processing, the bean product is filled into cans and subject to retorting.

Due in part to the starch content of the beans, as well as the high content of bean solids, the cooked bean product generally becomes very viscous prior to can-filling, essentially forming a paste. The bean starch tends to break down during the cooking process, producing a paste-like substance. The viscous nature of the bean paste may present concerns during processing. As the product becomes more viscous, it becomes more difficult to pump through process lines. Pumping difficulties may cause increased wear on the pumps, which in turn may result in additional maintenance requirements or more frequent replacement of the pumps. Additionally, as the product becomes less fluid-like, metering becomes less accurate and more difficult; in some cases, metering can become essentially impossible.

A high bean solids content also may result in the final bean product having undesirable and variable characteristics. Upon cooling, the canned bean product may become even more viscous and form a paste-gel product. This paste-gel product typically is not readily spoonable and thus is difficult to remove from the can. Moreover, the paste-gel texture of the product may be undesirable to consumers, as it does not resemble the texture of freshly made refried beans.

Conventional canned refried beans also tend to be less shelf stable and more variable than desired. As the refried beans are stored over time, water separates from the bean solids and forms a layer above the bean mass; such water separation is often observed within a few months of manufacturing. If the refried beans are reheated on a stove top for subsequent consumption, the ability to heat the beans evenly and to the desired temperature may be diminished as a result, in part, of the high bean solids content. Thus, the refried beans may easily be scorched during reheating. Moreover, the viscosity of the final product can vary significantly from batch to batch, often ranging from a semi-solid which is difficult to remove from the container to a soupy consistency with a overlying water layer.

Decreasing the solids content of the bean product by increasing the relative volume of water included in the product alone may not adequately remedy these problems. Although the viscosity of the bean product will decrease when an additional amount of water is used, the final bean product generally may not exhibit the desired characteristics of from-scratch refried beans (e.g., thick, chunky texture, flavorful bean taste, and the like).

Use of starch derivatives in textile, paper and prepared food applications has been reported. For such applications, the starch granules are often modified to change the chemical structure of the starch molecule, by methods including oxidation, esterification, and etherification. It is known that unmodified starch granules tend to swell and rupture relatively easily, producing weak-bodied cohesive pastes or undesirable gels. Thus, it is desirable to modify, typically through chemical treatment, a starch so that it will withstand conditions that otherwise would result in breakdown or gelation. Starch derivatives have been used to impart clarity, viscosity, and/or stability to the chosen product.

In U.S. Pat. No. 3,951,947, a starch derivative for use with heat-processed foods, such as canned pie fillings, soups, sauces, and puddings, is described. The starch derivative is a hydroxypropylated, cross-linked, high amylopectin, low amylose starch derivative that is intended to be slurried for use in the retort media. The starch derivative is not fully functional during mixing and pumping but fully activates during retorting.

In U.S. Pat. No. 4,973,447, a starch derivative useful in food applications that are typically subject to freeze-thaw cycles is described. The patent teaches isolation and purification of starch, followed by hydroxypropylation and cross-linking to provide the starch derivative. The starch derivative is used in food products to enhance freeze-thaw stability, as well as for providing thickening power, clarity, and stability. Representative applications described include products designed for freezing and products subject to multiple freeze-thaw cycles, such as pie and pastry fillings, puddings, custards, yogurts, salad dressings, pasta-type products, and baked goods.

There remains a need for compositions and processes related to leguminous products to enhance the preparation of such products, as well as to improve the characteristics of the final products. In particular, there is a need for compositions and methods that are readily processible and that will yield a containerized leguminous product having consistent characteristics similar to a leguminous product freshly made from scratch. Such compositions and methods should allow a reduced amount of legume solids to be used while maintaining the desired characteristics of the final product. The present invention addresses these needs.

SUMMARY OF THE INVENTION

The present invention provides compositions for preparing cooked leguminous food products having reduced amounts of legumes yet having enhanced texture and consistency. In important embodiments, the compositions include a modified food starch component for increasing the viscosity of the compositions and enhancing the stability of the cooked food product. The compositions are prepared by a process that includes blending a starch component as a slurry with legumes and water, such that the composition includes a reduced amount of legumes and an amount of a starch component effective for enhancing the viscosity of the composition, as well as the viscosity of the cooked product, cooking the composition and containerizing the cooked composition.

The refried bean product of this invention has a consistent "spoonable" viscosity which does not vary significantly from batch to batch. Moreover, by varying the starch and/or bean content, the viscosity can be adjusted as desired. The water-holding ability of the starch component improves the shelf stability of the cooked food product which maintains a blended composition for extended periods without separation of water from the legume mass. The water of the starch component also enhances reheating of the cooked product as the starch component will release water upon application of a heat source. The released water prevents scorching of the solid mass of the legume product, so that the product may be more evenly reheated to a desired temperature for consumption.

In important embodiments, the starch component is a food starch such as dent corn starch, waxy corn starch, potato starch, waxy potato starch, rice starch, sago starch, sorghum starch, waxy sorghum starch, tapioca starch, and wheat starch. Preferably, the starch component has been modified, such as by chemical treatment, so that the starch component is capable of withstanding the physical and chemical conditions associated with preparation of the cooked food product. Preferably, the composition includes no more than about 10 percent of the starch component.

In other important embodiments, the legumes are beans from plants of the Phaseolus genus, including navy, great northern, pinto, red, pink, black, and kidney beans, peas from plants of the Pisum genus, and chickpeas (i.e., garbanzo beans). In more preferred embodiments, the legumes are pinto beans. In additional preferred embodiments, the composition includes no more than about 25 percent beans, and more preferably about 19 to 22 percent beans.

The invention also provides methods of preparing a cooked leguminous food product from a composition that includes a reduced legume content. The method includes, in the process of making the food product, adding water to legumes to provide a composition having a reduced amount of legumes and a starch component to provide a predetermined viscosity of the composition, cooking the composition, and containerizing the cooked composition by subsequent mechanical processing of the composition which is facilitated by the viscosity of the composition.

In one embodiment, the present invention provides a composition for a cooked leguminous food product comprising: (1) legumes; (2) water in an amount effective for providing a predetermined content of legumes in the composition; and (3) a starch component in an amount effective for providing a first predetermined viscosity of the composition during preparation of the food product for facilitating mechanical processing of the composition and for providing a second predetermined viscosity of the food product, wherein the food product remains stable while containerized, has a thickened consistency, and is readily spoonable.

In another embodiment, the present invention provides a cooked bean composition having a reduced bean content for making a cooked bean product, the composition comprising: (1) beans; (2) water in an amount effective for providing the bean composition having no more than about 25 percent beans; and (3) a starch component in an amount effective for providing a first predetermined viscosity of the bean composition such that the composition is readily pumpable and a second predetermined viscosity of the cooked bean product such that the cooked bean product with a reduced bean content has enhanced texture and consistency.

In still another embodiment, the present invention provides a method of preparing a bean food product comprising: (1) providing an amount of beans; (2) blending water and a starch component with the beans to provide a mixture including a predetermined bean content; (3) heating the mixture to a temperature and for a time to provide a predetermined processing viscosity of the mixture effective for facilitating mechanical pumping and processing of the mixture; and (4) processing the mixture to provide a cooked bean food product having a predetermined final viscosity effective for enhancing the texture and consistency of the cooked bean product having a reduced bean content.

DETAILED DESCRIPTION OF THE INVENTION

Figure 1:
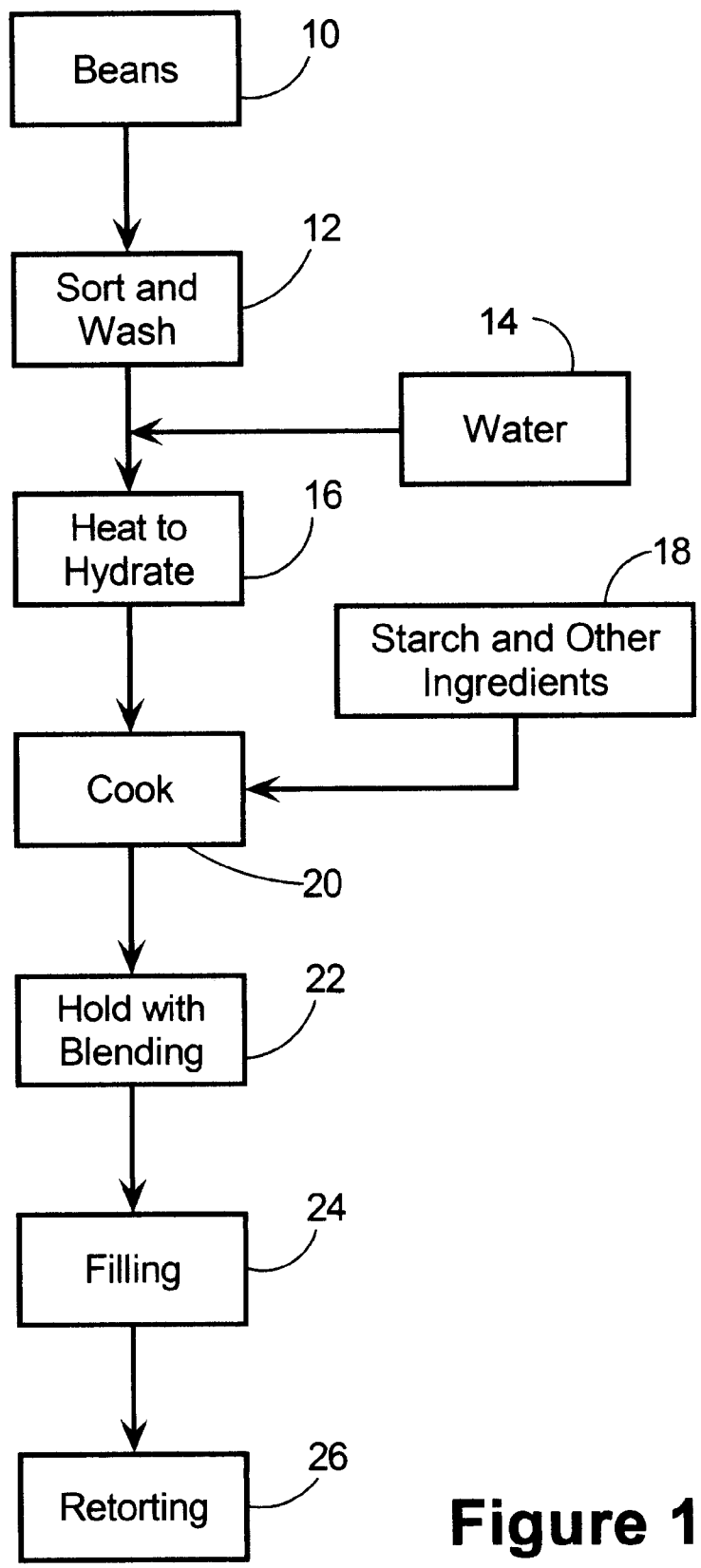
FIG. 1 provides a flow diagram illustrating a preferred process for the production of leguminous products having enhanced consistency and texture in accordance with the present invention.

The invention relates to leguminous compositions that are amenable to mechanical processing during preparation of a cooked food product having excellent organoleptic qualities. The leguminous compositions include a reduced amount of solids but exhibit a thick, chunky texture and a consistency that is neither too watery nor too paste-like or gelatinous. A reduced amount of solids in the composition without a corresponding negative impact on the consistency of the product is possible with incorporation of a starch component in the composition during processing. The cooked food products made from the compositions of the invention are shelf stable for extended periods of time and, upon reheating, have the appearance, texture and flavor of a similar product that has been freshly prepared from scratch. The compositions and methods of the present invention may be used in the process of making a cooked food product from any leguminous material and are particularly suited for preparation of cooked bean foods, especially canned refried beans.

As used herein, "leguminous" relates to plants that produce edible seeds, such as beans and peas. As used herein, "legume" is intended to include the seeds from any such leguminous plants. The terms relate to, but are not limited to, beans from plants of the Phaseolus genus, including navy, great northern, pinto, red, pink, black, and kidney beans, peas from plants of the Pisum genus, and chickpeas (i.e., garbanzo beans). Without wishing to limit the scope of this invention, the present invention is described herein for convenience with reference to a Mexican-style refried bean product, typically made with pinto beans, and a process of making such a refried bean product. As those skilled in the art will realize, other leguminous products can be prepared using similar techniques and processes.

Uncooked beans that will be used in the composition are sorted using conventional methods known to those skilled in the art to remove rocks and other foreign materials and then washed to remove any remaining dirt and other debris. Whole beans, bean splits, and mixtures thereof are used in the compositions of the present invention. Generally, bean mixtures containing mainly split beans are preferred. For a refried bean composition, the ratio of whole beans to beans splits preferably is between about 1:20 to about 1:30.

With dried beans, the beans preferably are pre-cooked or hydrated prior to cooking to reduce the time required to cook the beans. The washed beans are conveyed to a first tank for pre-cooking. Whole beans, bean splits, water, and flavorants are blended in the tank to provide a bean mixture. The amount of water used is sufficient for suspending and hydrating the beans. Flavorants include, for example, fatty substances (e.g., fat or oil), salt, other spices, vegetable pieces or particulates (e.g., onion, garlic), and the like. A preferred apparatus is a jacketed vat, such as a 500 gallon tank, with means for agitating, either manually or mechanically, the contents during cooking.

The bean mixture is brought to a boil and cooked until the beans are hydrated and softened. Preferably, the bean mixture is heated at a temperature of between about 190 to about 210° F. for between about 1.5 to about 2 hours. During cooking, the bean mixture preferably is agitated at least periodically to prevent the beans from settling and burning.

The bean mixture of the first tank is pumped to a second tank for additional processing. In the second tank, the remaining components of the refried bean product are blended with the bean mixture to form a composition having a reduced amount of bean solids. Additional water is added to the composition as needed to adjust the amount of water in the composition. Flavorants and other ingredients, including salt, other spices, oils, and/or fats, are added to the refried bean composition in the second tank to enhance and vary the flavor of the refried bean product.

To limit the corresponding decrease in viscosity associated with a reduction in the relative of amount of bean solids, either by increasing the amount of water or by decreasing the amount of bean solids, the refried bean composition of the present invention includes a starch component. The amount of starch component blended with the bean composition is effective for maintaining an in-process hot viscosity of the composition that will facilitate pumping of the composition. Preferably the amount of starch is sufficient to achieve a Bostwick consistometer (CSC Scientific, Fairfax, Va.) reading of about 10 cm or greater at about 180° F. after a period of about 1 to about 3 minutes. The amount of starch component also is effective for providing a cooked bean product that has a texture, consistency, and appearance similar to a related product freshly made from scratch with a higher bean solids content. The starch component preferably is treated to enhance the stability of the starch during processing of the refried bean composition, particularly to withstand physical and chemical conditions, such as elevated temperatures associated with cooking and physical agitation.

As used herein, "starch component" is intended to include any food starch or starch derivative of a food starch that will act as a processing aid during preparation of a bean composition, as well as provide stability to the final product. Types of food starches include dent corn starch, waxy corn starch, potato starch, waxy potato starch, rice starch, sago starch, sorghum starch, waxy sorghum starch, tapioca starch, and wheat starch. As used herein, "starch derivative" relates to any food starch that has been treated, chemically or otherwise, to provide a modified food starch that will withstand chemical and physical conditions that otherwise would be expected to cause breakdown or gelation in an unmodified starch. Typical chemical treatments for preparing modified starches include cross-linking, stabilization (including hydroxypropylation), pre-gelatinization, bleaching, mild acid treatment, oxidation, and substitution. As an example, the starch component may be a dual modified waxy maize starch such as Thermtex which is available from National Starch and Chemical Company, Bridgewater, N.J.; this cross-linked starch provides heat and shear stability as well as shelf-life stability against retrogradation.

In the second tank, a pre-mixed starch slurry is blended with the hot bean mixture. Prior to introduction into the second tank, the starch slurry is prepared in a separate mixer at ambient temperature. An amount of starch component is blended with an amount of water sufficient to form a slurry. Generally about 10 to about 50 percent starch in water is satisfactory; more preferably, the about 15 to 25 percent starch in water is employed. A desired hot viscosity of the refried bean composition after cooking in the second tank can be achieved by adjusting the amount of starch slurry used (e.g., the hot viscosity can be increased by increasing the amount of slurry added). Preferably, the starch slurry is added to provide no more than about 10 percent starch component in the refried bean composition. Even more preferably, the starch slurry is added to provide about 0.5 to about 2 percent starch in the final product. Of course, the concentration of the starch slurry and amount of starch slurry added will depend on the desired water and starch contents of the final product.

Prior to cooking in the second tank, the refried bean composition includes hydrated beans (whole beans and bean splits), water, starch component, and other ingredients, primarily for flavoring, including salt, spices, and oil/fat component. Preferably, the bean composition includes bean solids in an amount of no more than about 27 percent. More preferably, the refried bean composition includes bean solids in an amount of from about 18 to about 25 percent and even more preferably from about 19 to about 21 percent. Similarly, the refried bean composition includes at least about 70 percent water. More preferably, the refried bean composition includes water in an amount of from about 70 to about 80 percent and even more preferably from about 74 to about 78 percent. The refried bean composition also includes between about 0.2 to about 10 percent starch component, more preferably about 0.5 to about 2 percent starch component, and most preferably about 0.8 to about 1.5 percent starch component. Additionally, the remainder of the refried bean composition includes other ingredients, including salt, other spices, oil, fat, and/or other flavorants. Suitable oils and fats used in the present invention include, for example, animal fats (e.g., lard, tallow, and the like) and vegetable fats (e.g., soybean, cottonseed, canola, and the like).

The refried bean composition is cooked in the second tank at a second temperature for a time sufficient to yield a cooked refried bean product. Preferably, the refried bean composition is heated to about 185 to about 195° F. for about 45 to about 60 minutes. A preferred second tank is a 500 gallon tank equipped with a mixing mechanism for blending and mechanically agitating the refried bean composition during cooking.

The cooked refried bean composition is pumped to a holding blender where it is held for about 10 to 15 minutes with blending at a temperature of about 180 to about 185° F. The cooked refried bean composition is pumped to downline equipment for containerizing the composition for subsequent shipment and sale. The refried bean composition is containerized in cans or other suitable containers using any conventional filling and retorting methods and equipment known to those of skill in the art. Due in part to the reduction in solids in the cooked refried bean composition, subsequent processing of the composition after cooking in the second tank is facilitated. The lower-viscosity composition is more readily pumped through processing lines, resulting in reduced wear on the pumps. Metering of the refried bean composition also is enhanced.

The processed composition yields a final, cooked refried bean product having a reduced amount of bean solids with enhanced flavor, texture and appearance. The cooked refried bean product is consumable direct from the can or with reheating to a desired temperature.

The refried bean product of the present invention is expected to exhibit several benefits. The starch component of the composition limits excessive gelling and thickening of the product. Thus, although the refried bean product solidifies to some degree upon cooling, it does not solidify to such an extent that it forms essentially a solid or extremely viscous mass in the can. Instead, the cooled refried bean product has a thickened consistency but is readily spoonable from the can. Moreover, the cooled refried bean product has a consistent viscosity which does not significantly change with storage time.

The starch component also generally has the capacity to hold water. The starch component thus enhances the stability of the canned refried bean product by reducing water migration that otherwise would be expected to occur in a refried bean product over time. As a result, only a minimal water layer or essentially no water layer will form above the product of the present invention as it remains stored in a can over a period of about 18 months. Thus, the refried bean product of this invention has a shelf-life of at least about 18 months.

The cooked refried bean product also is capable of being more evenly reheated to a desired temperature without scorching, particularly when reheated over a burner. When the refried bean product is removed from the can and reheated for consumption, the starch will yield its water content during reheating. The presence of additional water helps to prevent scorching of the bean solids in the thickened refried bean product. With a reduced potential for scorching, the refried bean product may heated for longer periods so as to achieve a desired temperature evenly throughout the product. Moreover, the likelihood of "splattering" during reheated is significantly reduced.

The present invention allows the preparation of a cooked refried bean product having excellent characteristics by incorporation of a modified food starch during the process of making the cooked refried bean product. As shown in FIG. 1, the cooked refried bean product is prepared using a procedure that includes the following: (i) providing an amount of beans 10 and sorting and washing 12 the beans with water to remove foreign material and other contaminants; (ii) suspending a mixture of whole beans and bean splits in water 14 and heating 16 the mixture to a temperature of about 190 to about 210° F. for about 1.5 to about 2 hours to hydrate the bean mixture; (iii) adding a starch slurry and other desired flavor- and texture-enhancing ingredients 18 to the heated bean mixture and heating 20 the composition to a temperature of about 185 to about 195° F. with mixing for about 45 to about 60 minutes; (iv) holding the cooked product with blending 22 for about 10 to about 15 minutes; (v) filling 24 the cooked product into containers; and (vi) retorting 26 the canned product. The starch and other ingredients 18 can be added to the cooker 20 before or during the cooking operation. Preferably, starch and other ingredients 18 are be added to the cooker 20 during the cooking operation. For example, the beans can be cooked for about two hours before the starch and other ingredients 18 are added, with cooking continued for about an additional 10 to 20 minutes after the addition. Addition of the starch in this manner allows it to fully cook while avoiding heat and/or shear damage.

EXAMPLES

The following examples are intended to illustrate the invention and not limit or otherwise restrict the invention. Unless otherwise noted, all percentages and ratios in this specification are by weight.

Example 1

This example illustrates a typical composition (i.e., control) for preparing a refried bean product having a conventional amount of bean solids. The types and relative amounts of ingredients included in such a conventional composition are set forth in Table 1.

TABLE 1

| Ingredient | Amount (%) |
|---|---|
| Water | 70.7 |
| Pinto Beans | 27.5 |
| Salt | 1.1 |
| Spices | 0.7 |

Example 2

This example illustrates a first composition for preparing a refried bean product having a reduced amount of bean solids in accordance with the present invention. The types and relative amounts of ingredients included in the composition are set forth in Table 2.

TABLE 2

| Ingredient | Amount (%) |
|---|---|
| Water | 75.6 |
| Pinto Beans (split) | 21.0 |
| Pinto Beans (whole) | 0.6 |
| Starch Component | 1.0 |
| Salt | 1.1 |
| Spices | 0.7 |

Example 3

This example illustrates a second composition for preparing a refried bean product having a reduced amount of bean solids in accordance with the present invention. The types and relative amounts of ingredients included in the composition are set forth in Table 3.

TABLE 3

| Ingredient | Amount (%) |
|---|---|
| Water | 76.6 |
| Pinto Beans (split) | 20.0 |
| Pinto Beans (whole) | 0.6 |

TABLE 3-continued

| Ingredient | Amount (%) |
| --- | --- |
| Starch Component | 1.0 |
| Salt | 1.1 |
| Oil | 0.6 |
| Flavorants | 0.03 |

Example 4

This example illustrates the effect of addition of starch component to the composition on the hot viscosity of the cooked product. The composition of Example 1 above was used as a control sample. The composition of Example 2 was tested with varying amounts of starch component added. The viscosity of cooked refried bean product was measured using a Rapid Visco Analyzer (Newport Scientific, New South Wales, Australia; viscosity reported in RVU units) at about 120° F. Sample size was about 30 grams of cooked product which was stirred at about 100 rpm. The temperature of the product was about 185° F. With the reduced bean solids composition, as the amount of starch component added to the composition increased, the hot viscosity (120° F.) of the composition increased. A comparison of hot viscosities of compositions with differing amounts of starch addition is set forth in Table 4. As shown in Table 4, the hot viscosity of the control sample was considerably higher than that of the reduced bean solids composition at lower levels of starch component addition.

TABLE 4

| Amount of Starch Component (%) | Bean Solid Content (%) | Viscosity (RVU) |
| --- | --- | --- |
| 0 (control) | 28 | 1711 |
| 0.8 | 22 | 1234 |
| 1.0 | 22 | 1452 |
| 1.25 | 22 | 2207 |

What is claimed is:

1. A composition for a cooked leguminous food product comprising: (1) legumes; (2) water in an amount effective for providing a predetermined content of legumes in the composition; and (3) a starch component in an amount effective for providing a first predetermined viscosity of the composition during preparation of the food product for facilitating mechanical processing of the composition and for providing a second predetermined viscosity of the food product, wherein the food product remains stable while containerized, has a thickened consistency, and is readily spoonable.

2. A composition in accordance with claim 1, wherein the starch component is a modified food starch selected from the group consisting of dent corn starch, waxy corn starch, potato starch, waxy potato starch, rice starch, sago starch, sorghum starch, waxy sorghum starch, tapioca starch, and wheat starch.

3. A composition in accordance with claim 1, wherein the starch component has been chemically modified.

4. A composition in accordance with claim 1, wherein the starch component is present in an amount between about 0.5 to about 2 percent.

5. A composition in accordance with claim 1, wherein the legumes are beans selected from the group consisting of navy, great northern, pinto, red, pink, black, and kidney beans.

6. A composition in accordance with claim 5, wherein the composition has a bean content of no more than about 25 percent.

7. A cooked bean composition having a reduced bean content for making a cooked bean product, the composition comprising: (1) beans; (2) water in an amount effective for providing the bean composition having no more than about 25 percent beans; and (3) a starch component in an amount effective for providing a first predetermined viscosity of the bean composition such that the composition is readily pumpable and a second predetermined viscosity of the cooked bean product such that the cooked bean product with a reduced bean content has enhanced texture and consistency.

8. A composition in accordance with claim 7, wherein the composition includes beans in an amount of about 19 to about 22 percent.

9. A composition in accordance with claim 7, wherein the composition includes starch in an amount between about 0.5 to about 2 percent.

10. A composition in accordance with claim 7, wherein the starch component is a chemically modified starch.

11. A composition in accordance with claim 10, wherein the composition includes starch in an amount between about 0.5 to about 2 percent.

12. A composition in accordance with claim 10, wherein the starch component is a modified food starch selected from the group consisting of dent corn starch, waxy corn starch, potato starch, waxy potato starch, rice starch, sago starch, sorghum starch, waxy sorghum starch, tapioca starch, and wheat starch.

13. A composition in accordance with claim 12, wherein the starch component is present in an amount between about 0.8 to about 1.5 percent.

14. A composition in accordance with claim 7, wherein the beans are whole beans, bean splits, or mixtures thereof.

15. A bean paste composition in accordance with claim 7, wherein the starch component has a capacity to retain water, and wherein the starch component releases water upon application of heat thereby facilitating heating of the bean product to a predetermined temperature for consumption by providing additional moisture for limiting scorching of the product.

16. A composition in accordance with claim 7 further comprising spices.

17. A composition in accordance with claim 7 further comprising a fatty substance.

* * * * *

UNITED STATES PATENT AND TRADEMARK OFFICE
CERTIFICATE OF CORRECTION

PATENT NO. : 6,602,539 B2  Page 1 of 1
DATED : August 5, 2003
INVENTOR(S) : Stubbs et al.

It is certified that error appears in the above-identified patent and that said Letters Patent is hereby corrected as shown below:

<u>Title page,</u>
Item [75], Inventors, change "Betsy" to -- Bettsye --.

Signed and Sealed this

Sixteenth Day of December, 2003

JAMES E. ROGAN
*Director of the United States Patent and Trademark Office*